(12) United States Patent
Jitkoff et al.

(10) Patent No.: US 9,966,071 B2
(45) Date of Patent: May 8, 2018

(54) DISAMBIGUATING INPUT BASED ON CONTEXT

(71) Applicant: Google LLC, Mountain View, CA (US)

(72) Inventors: John Nicholas Jitkoff, Palo Alto, CA (US); Michael J. LeBeau, New York, NY (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/200,619

(22) Filed: Jul. 1, 2016

(65) Prior Publication Data

US 2016/0314788 A1 Oct. 27, 2016

Related U.S. Application Data

(60) Continuation of application No. 14/733,073, filed on Jun. 8, 2015, now Pat. No. 9,401,147, which is a (Continued)

(51) Int. Cl.
*G06F 17/27* (2006.01)
*G10L 15/24* (2013.01)
(Continued)

(52) U.S. Cl.
CPC .......... *G10L 15/24* (2013.01); *G01C 21/3608* (2013.01); *G10L 15/1815* (2013.01);
(Continued)

(58) Field of Classification Search
CPC .... G06F 17/27; G06F 17/2705; G06F 17/271; G06F 17/273274; G06F 17/2785;
(Continued)

(56) References Cited

U.S. PATENT DOCUMENTS 6,429,813 B2 8/2002 Feigen
6,714,778 B2 3/2004 Nykänen et al.
(Continued)

FOREIGN PATENT DOCUMENTS

EP 2 214 122 8/2010

OTHER PUBLICATIONS

Authorized Officer B. R. Copenheaver. International Search Report and Written Opinion in international application No. PCT/US2011/046629, dated Dec. 9, 2011, 14 pages.
(Continued)

*Primary Examiner* — Qi Han
(74) *Attorney, Agent, or Firm* — Fish & Richardson P.C.

(57) ABSTRACT

In one implementation, a computer-implemented method includes receiving, at a mobile computing device, ambiguous user input that indicates more than one of a plurality of commands; and determining a current context associated with the mobile computing device that indicates where the mobile computing device is currently located. The method can further include disambiguating the ambiguous user input by selecting a command from the plurality of commands based on the current context associated with the mobile computing device; and causing output associated with performance of the selected command to be provided by the mobile computing device.

14 Claims, 7 Drawing Sheets

Related U.S. Application Data division of application No. 13/186,877, filed on Jul. 20, 2011, now Pat. No. 9,053,706, which is a continuation of application No. 12/851,881, filed on Aug. 6, 2010, now Pat. No. 8,473,289.

(51) Int. Cl.

| | | |
|---|---|---|
| *G01C 21/36* | (2006.01) | |
| *G10L 15/18* | (2013.01) | |
| *G10L 15/22* | (2006.01) | |
| *G10L 15/30* | (2013.01) | |
| *H04M 1/725* | (2006.01) | |
| *G10L 15/26* | (2006.01) | |
| *G10L 15/20* | (2006.01) | |

(52) U.S. Cl.
CPC ............ *G10L 15/20* (2013.01); *G10L 15/22* (2013.01); *G10L 15/26* (2013.01); *G10L 15/30* (2013.01); *H04M 1/72569* (2013.01); *H04M 1/72572* (2013.01)

(58) Field of Classification Search
CPC .. G06F 17/2872; G06F 17/273; G06F 17/274; G10L 15/00; G10L 15/18; G10L 15/1815; G10L 15/1822; G10L 15/183; G10L 15/187; G10L 15/19; G10L 15/20; G10L 15/24; G10L 15/26; G10L 15/28; G10L 15/30; G10L 2015/00; G10L 2015/06; G10L 2015/22; G10L 2015/221; G10L 2015/223; G10L 2015/228
USPC .... 704/235, 231, 251, 255, 275, 270.1, 1, 2, 704/9
See application file for complete search history.

(56) References Cited

U.S. PATENT DOCUMENTS

| | | | |
|---|---|---|---|
| 7,024,364 B2 | 4/2006 | Guerra et al. | |
| 7,472,020 B2 | 12/2008 | Brulle-Drews | |
| 7,490,042 B2 | 2/2009 | Eide et al. | |
| 7,493,259 B2 | 2/2009 | Jones et al. | |
| 7,523,012 B2 | 4/2009 | Shah et al. | |
| 7,716,158 B2 | 5/2010 | McConnell | |
| 7,831,433 B1 | 11/2010 | Belvin et al. | |
| 7,881,936 B2 | 2/2011 | Longé et al. | |
| 7,890,324 B2 | 2/2011 | Bangalore et al. | |
| 8,473,289 B2 | 6/2013 | Jitkoff et al. | |
| 2002/0116196 A1 | 8/2002 | Tran | |
| 2004/0172258 A1 | 9/2004 | Dominach et al. | |
| 2006/0004572 A1 | 1/2006 | Ju et al. | |
| 2006/0026078 A1* | 2/2006 | King .................. H04N 1/00244 382/306 |
| 2006/0041538 A1 | 2/2006 | King et al. | |
| 2006/0106604 A1* | 5/2006 | Okimoto ................. G10L 15/06 704/243 |
| 2006/0247915 A1 | 11/2006 | Bradford et al. | |
| 2006/0287859 A1 | 12/2006 | Hetherington | |
| 2008/0091426 A1 | 4/2008 | Rempel | |
| 2008/0131851 A1 | 6/2008 | Kanevsky et al. | |
| 2008/0301112 A1 | 12/2008 | Wu | |
| 2009/0150156 A1 | 6/2009 | Kennewick et al. | |
| 2009/0150160 A1 | 6/2009 | Mozer | |
| 2009/0164216 A1 | 6/2009 | Chengalvarayan et al. | |
| 2009/0249198 A1 | 10/2009 | Davis et al. | |
| 2010/0100384 A1 | 4/2010 | Ju | |
| 2010/0145700 A1 | 6/2010 | Kennewick et al. | |
| 2011/0161076 A1 | 6/2011 | Davis et al. | |
| 2012/0035924 A1 | 2/2012 | Jitkoff et al. | |
| 2012/0035932 A1 | 2/2012 | Jitkoff et al. | |

OTHER PUBLICATIONS

International Preliminary Report on Patentability in International Application No. PCT/US2011/046629, dated Feb. 21, 2013, 8 pages.

Extended European Search Report in EP Application No. 11815333.7, dated Nov. 28, 2013, 5 pages.

* cited by examiner

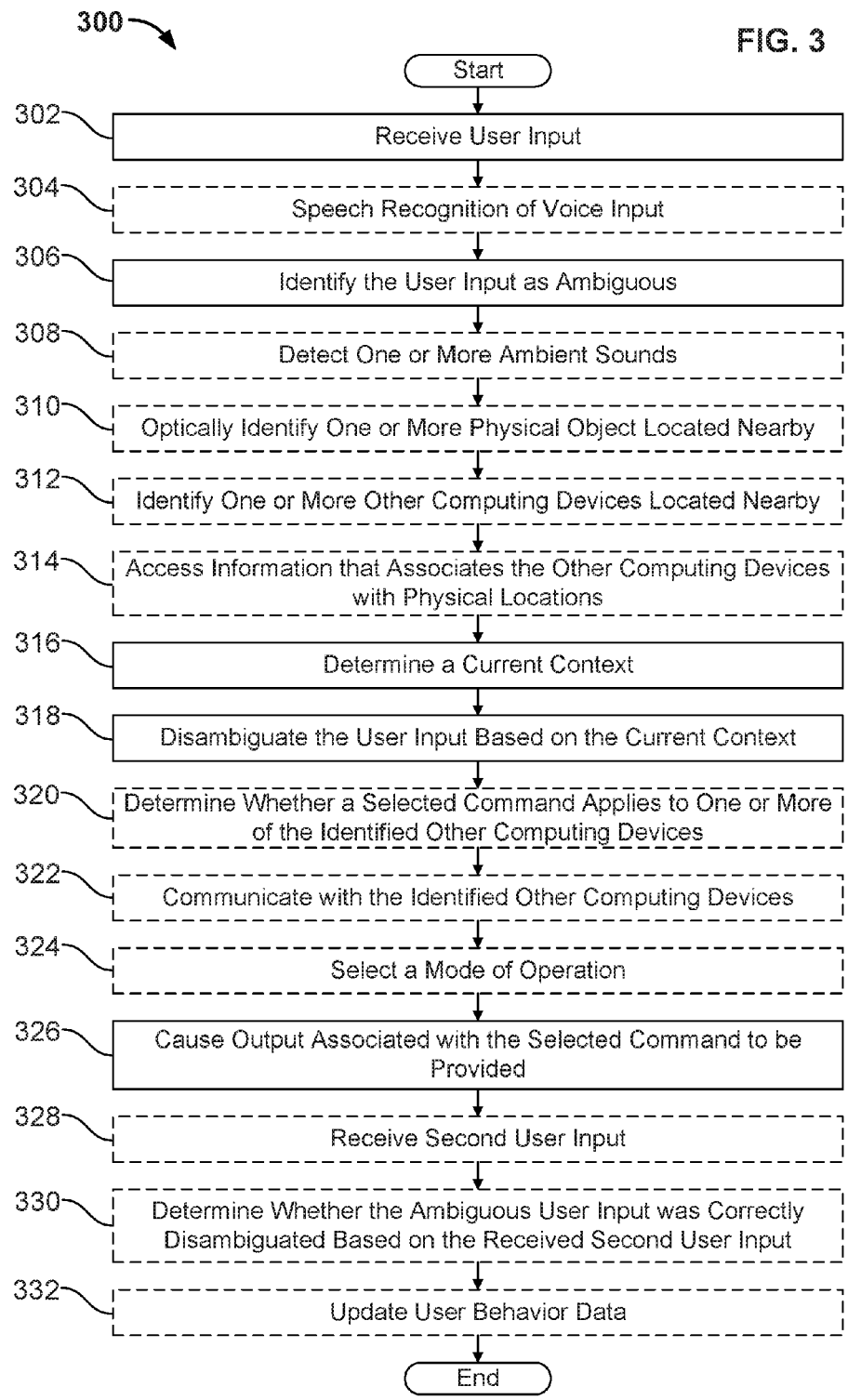

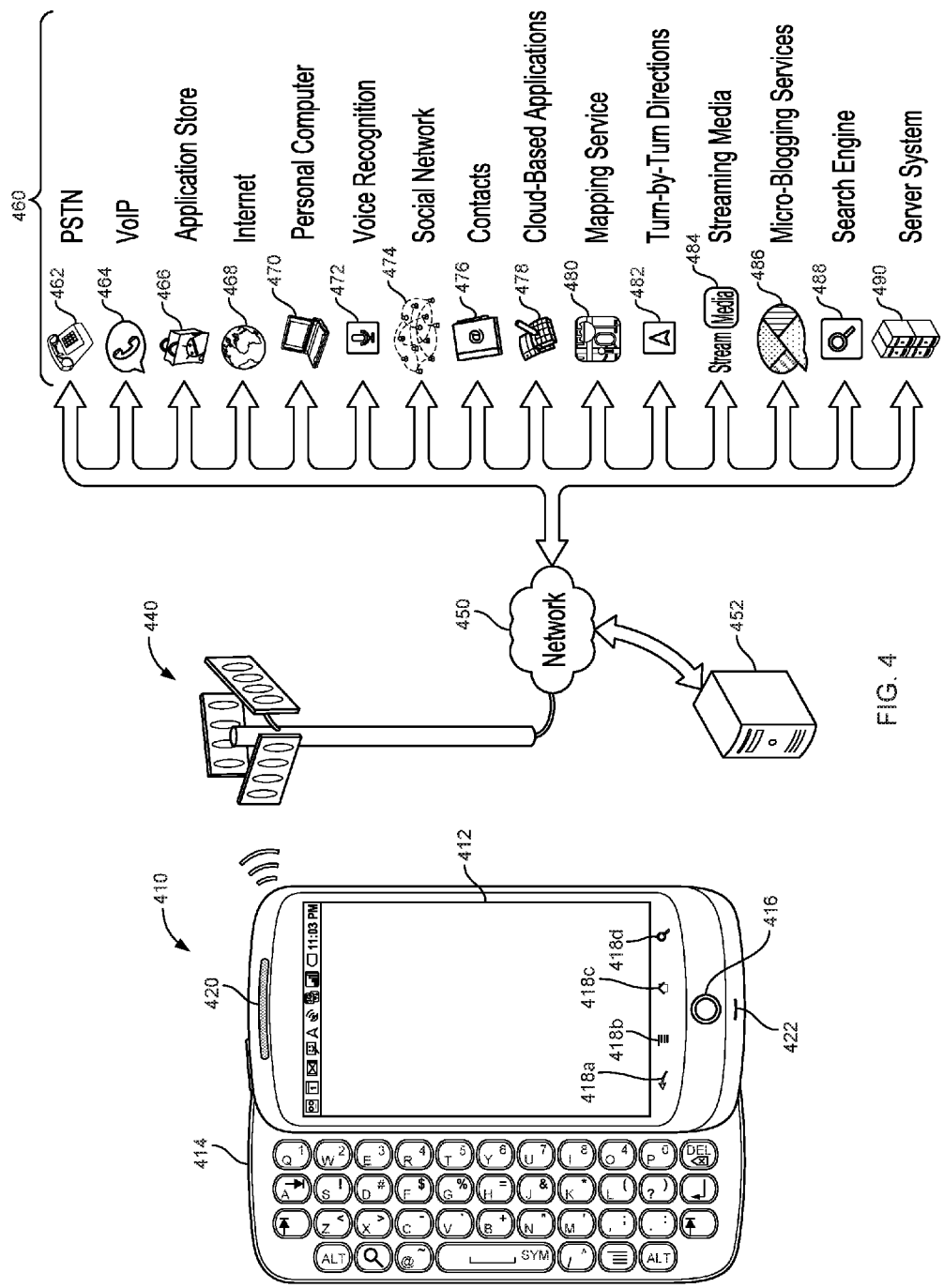

DISAMBIGUATING INPUT BASED ON CONTEXT

CROSS-REFERENCE TO RELATED APPLICATION

This application is a continuation of U.S. patent application Ser. No. 14/733,073, filed on Jun. 8, 2015, which claims priority to Ser. No. 13/186,877, filed on Jul. 20, 2011, which claims priority to U.S. patent application Ser. No. 12/851,881, filed on Aug. 6, 2010, which is herein incorporated by reference in its entirety.

TECHNICAL FIELD

This document generally describes methods, systems, and techniques for disambiguating user input on a mobile computing device, such as a mobile telephone.

BACKGROUND

Mobile computing devices (e.g., mobile telephones, smart telephones, personal digital assistants (PDAs), portable media players, etc.) have been configured to provide results to a user in response to unambiguous input. For example, a user can submit a search query for directions to a nearby pizzeria to a mobile computing device. In such an example, the search query unambiguously identifies that directions for a nearby pizzeria. In response, the mobile computing device can (alone, or in combination with a remote server system) identify a nearby pizzeria and provide directions to the pizzeria to the user. Such mobile computing devices have been configured to receive a search query as text-based input (e.g., a query typed using keys), selection-based input (e.g., touchscreen selection, etc.), and audio-based input (e.g., voice input). When the query has some ambiguity, multiple results can be provided (with a highest scoring result at the top and ordered by decreasing relevance) and a user can be given the opportunity to select one of the results.

SUMMARY

In the techniques described in this document, the context of a computing device, such as a mobile telephone (e.g., smart phone, or app phone) is taken into consideration in order to disambiguate ambiguous user inputs. Ambiguous user input is input that, in the absence of relevant disambiguating information, would be interpreted by the computing device or for the computing device (e.g., by a server system with which the computing device is in electronic communication) as corresponding to more than one query or command. Ambiguous input may be particularly common for spoken input, in part because of the presence of homophones, and in part because a speech-to-text processor may have difficulty differentiating words that are pronounced differently but sound similar to each other. For example, if a user says "search for sail/sale info" to a mobile computing device, this voice input can be ambiguous as it may correspond to the command "search for sail info" (e.g., information regarding a sail for a sailboat) or to the command "search for sale info" (information regarding a sale of goods). A device might even determine that the input was "search for sell info," because "sell" and "sale" sound alike, particularly in certain dialects.

Using the techniques described here, ambiguous user input can be disambiguated based on a context associated with a mobile computing device (and/or a user of the mobile computing device) that is separate from the user input itself, such as the physical location where the mobile computing device is located (e.g., home, work, car, etc.), motion of the mobile computing device (e.g., accelerating, stationary, etc.), and recent activity on the mobile computing device (e.g., social network activity, emails sent/received, telephone calls made/received, etc.). For instance, if a user provides voice input "traffic" to a mobile computing device while travelling at a high rate of speed in a car, the voice input may not be clearly received by the mobile computing device because of ambient noise from the car (e.g., engine noise, wind, road noise, car stereo, etc.). Due to the lack of clarity for the voice input, the mobile computing device may interpret the voice input as being any of multiple different words that sound like "traffic," such as "graphic." To resolve the ambiguity with regard to the voice input (e.g., did the user say "traffic" or "graphic?"), the mobile computing device can determine that it is likely located in a car based, at least in part, on the mobile computing device sensing that it is travelling at a high rate of speed (e.g., using any of a variety of motion sensors that are standard components of the device). Based on the mobile computing device's determined context (located in a car), the mobile computing device can determine that the user was more likely to have said "traffic" (as in automobile traffic on a road) than "graphic" and can disambiguate the voice input to "traffic."

In another example, a device that is docked may determine the type of dock it is in, such as via physical electrical contacts on the dock and device that match each other, or via electronic communication (e.g., via Bluetooth or RFID) between the dock and the device. For example, a certain pin arrangement may be provided on a dock intended for home use, while a different arrangement may be provided for a dock intended and sold for in-car use. The device may then set its context as "in car" or "at home" based on such a determination. The device my then disambiguate spoken input such as "directions," where the term could be interpreted as geographic directions (e.g., driving directions) in an "in car" context, and how-to directions (e.g., for cooking) in an "at home" mode.

In one implementation, a computer-implemented method includes receiving, at a mobile computing device, ambiguous user input that indicates more than one of a plurality of commands; and determining a current context associated with the mobile computing device that indicates where the mobile computing device is currently located. The method can further include disambiguating the ambiguous user input by selecting a command from the plurality of commands based on the current context associated with the mobile computing device; and causing output associated with performance of the selected command to be provided by the mobile computing device.

In another implementation, a system for disambiguating user input includes a mobile computing device and an input sub-system of the mobile computing device that is configured to receive ambiguous user input that indicates more than one of a plurality of commands. The system can further include a context determination unit of the mobile computing device that is configured to determine a current context associated with the mobile computing device that indicates where the mobile computing device is currently located. The system can also include an input disambiguation unit of the mobile computing device that is configured to disambiguate the ambiguous user input by selecting a command from the plurality of commands based on the current context associated with the mobile computing device. The system can additionally include an output sub-system of the mobile computing device that is configured to provide output associated with performance of the selected command.

In another implementation, a system for disambiguating user input includes a mobile computing device and an input sub-system of the mobile computing device that is configured to receive ambiguous user input that indicates more than one of a plurality of commands. The system can also include a context determination unit of the mobile computing device that is configured to determine a current context associated with the mobile computing device that indicates where the mobile computing device is currently located. The system can further include means for disambiguating the ambiguous user input based on the current context associated with the mobile computing device, wherein the means for disambiguating selects a command from the plurality of commands; and an output sub-system of the mobile computing device that is configured to provide output associated with performance of the selected command.

The details of one or more embodiments are set forth in the accompanying drawings and the description below. Various advantages can be realized with certain implementations, such as permitting users to instruct a mobile computing device to perform a desired task without requiring the user to comply with all of the formalities of providing input for the desired task. As features provided by a mobile computing device have increased, users may be required to provide their input with greater specificity so that the input is properly associated with the intended feature. However, such specificity can be cumbersome and difficult to remember. The described methods, systems, techniques, and mechanisms described in this document can allow a user to provide input using less specificity than formally required for a feature yet still access the intended feature.

Other features, objects, and advantages of the invention will be apparent from the description and drawings, and from the claims.

DESCRIPTION OF DRAWINGS

FIG. 3 is a flowchart of an example technique for disambiguating ambiguous user input on a mobile computing device.

FIG. 4 is a conceptual diagram of a system that may be used to implement the techniques, systems, mechanisms, and methods described in this document.

Like reference symbols in the various drawings indicate like elements.

DETAILED DESCRIPTION

Figure 1A:
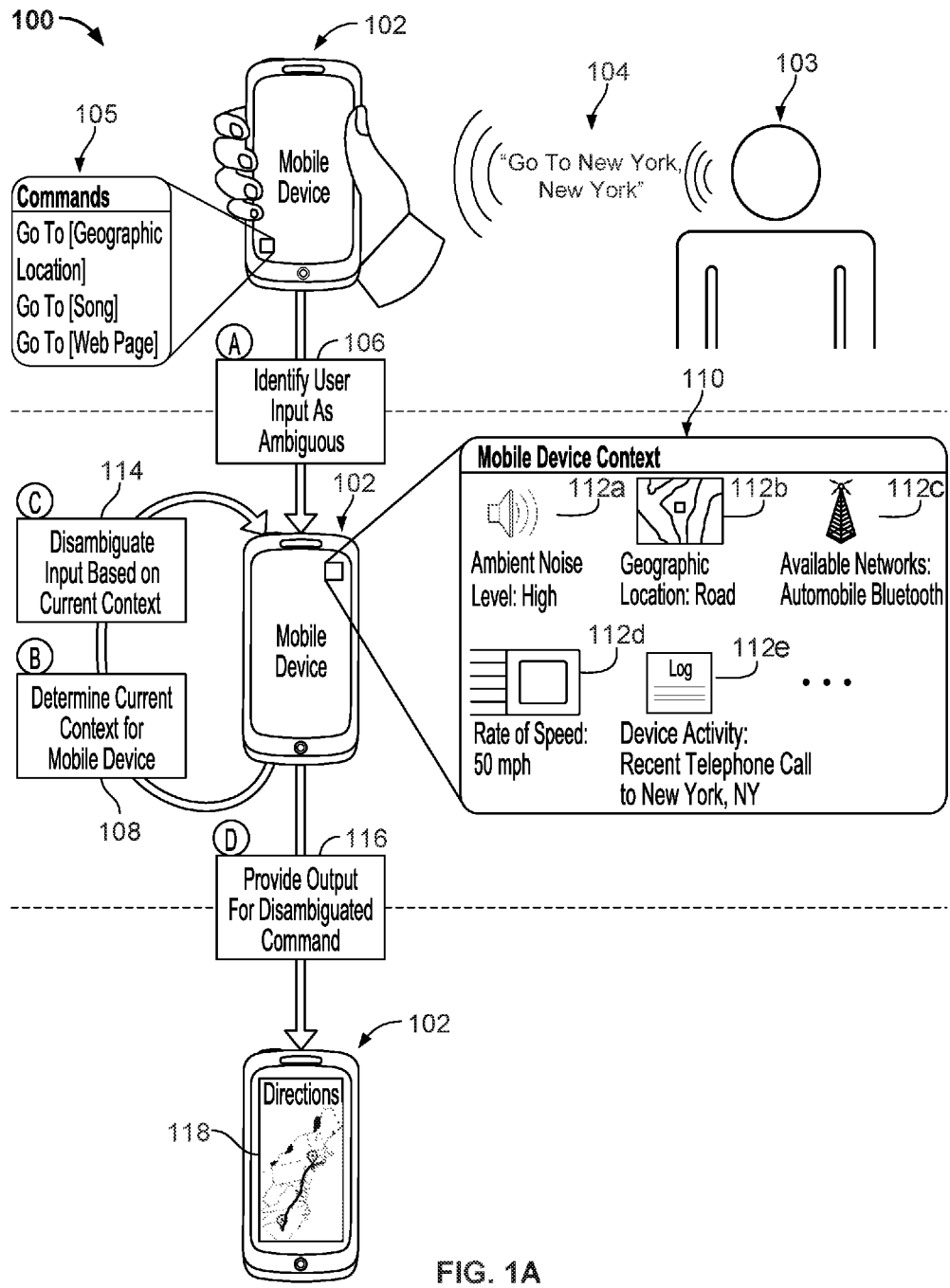
FIGS. 1A-B are conceptual diagrams of example mobile computing devices for disambiguating ambiguous user input.

This document describes techniques, methods, systems, and mechanisms for disambiguating ambiguous user input on a mobile computing device (e.g., mobile feature telephone, smart telephone (e.g., IPHONE, BLACKBERRY), personal digital assistant (PDA), portable media player (e.g., IPOD), etc.). As the features provided by mobile computing devices have increased, the number of commands recognized by a mobile computing device can increase as well. For example, each feature on a mobile computing device may register one or more corresponding commands that a user can type, speak, gesture, etc. to cause the feature to be launched on the mobile computing device. However, as the number of recognized commands increases, commands can converge and make it more difficult to distinguish to which of multiple commands user input is intended to correspond. The problem is magnified for voice input. For example, voice input that is provided with loud background noise can be difficult to accurately interpret and, as a result, can map to more than one command recognized by the mobile computing device. For instance, voice input "example" could be interpreted as, among other things, "egg sample," "example," or "exam pull." As another example, the command "go to" may represent "go to [geographic location]" for a mapping application, and "go to [artist/album/song]" for a media player.

Using the techniques described here, in response to receiving ambiguous user input, a current context for the mobile device (and/or a user of the mobile computing device) can be determined and used to disambiguate the ambiguous user input. A current context for a mobile computing device can include a variety of information associated with the mobile computing device and/or a user of the mobile computing device. The context may be external to the device and represent a real time status around the device, such as a current physical location (e.g., home, work, car, located near wireless network "testnet2010," etc.), a direction and rate of speed at which the device is travelling (e.g., northbound at 20 miles per hour), a current geographic location (e.g., on the corner of 10th Street and Marquette Avenue), and ambient noise (e.g., low-pitch hum, music, etc.). The context may also be internal to the device, such as upcoming and/or recent calendar appointments (e.g., meeting with John at 2:30 pm on Jul. 29, 2010), a time and date on a clock in the device (e.g., 2:00 pm on Jul. 29, 2010), recent device activity (e.g., emails sent to John regarding the 2:30 meeting), and images from the mobile computing devices camera(s).

The device can use the current context to select a command or query from multiple commands or queries that would otherwise be suggested in the absence of using the context. For example, if a user provides voice input "call Seth" to a mobile computing device using a wireless headset (e.g., BLUETOOTH headset) while driving on the freeway, ambient noise picked up from traveling on the freeway may make the voice input ambiguous—the voice input can be interpreted as "call Beth" and "call Seth." For the purposes of this example, assume that Beth and Seth are both contacts in a list of telephone contacts for the user, but that the user is travelling on the freeway toward Seth's house. The current context for the mobile device can include, at least, that the mobile computing device is travelling on a freeway in an automobile heading toward Seth's house (as determined by accessing a contact record for Seth that is associated with the user's device or an on-line account to which the device is logged in). The context can be determined based on a variety of information associated with the mobile computing device, such as the freeway background noise, the connection with the wireless headset, geographic positioning information (e.g., global positioning system (GPS) information), digital road maps, contact list information (e.g., Seth's address), etc. Based on the current context, the mobile computing device can disambiguated the ambiguous user voice input (interpreted as "call Seth" or "call Beth") to "call Seth"—it appears that the user is travelling to meet up with Seth and may be calling to provide an update on his/her status.

As described in further detail below, a mobile computing device can disambiguate ambiguous user input locally on the mobile computing device and/or in conjunction with a computer server system that is remote from the mobile computing device. For example, a mobile computing device can determine its current context, disambiguate user input based on the current context, and cause a command associated with the disambiguated input to be performed as a standalone device (e.g., without interacting with other devices over a network). In another example, a mobile computing device can interact with a remote server system to determine its current context, disambiguate user input based on the current context, and perform a command associated with the disambiguated input. The device can also determine its current context and send data that identifies the current content to a server system, which may then disambiguate a user input.

In addition to using a device's context to disambiguate ambiguous input, a device may also provide output from performance of a command or query (or combination of command and a parameter that together make up a query, such as "search for X") associated with disambiguated input based on the current context. For instance, if the mobile computing device is determined to have a current context of being located inside of a moving car, the mobile computing device can switch into a "hands free" mode (e.g., activate microphone to receive voice input and provide audio output) for safety and can provide output accordingly.

The techniques, methods, systems, and mechanisms described in this document for disambiguating user input can be used to disambiguate a variety of user input, not just input related to commands. For example, disambiguation based on a current context for a mobile computing device and/or a user of the mobile computing device can be used to select a suggested spelling for a misspelled word. For instance, if a user types "toad work" into a search field on a mobile computing device and the current context for the mobile computing device includes the mobile computing device being located in an automobile, the mobile computing device can suggest the string "road work" to the user instead.

Figure 1B:
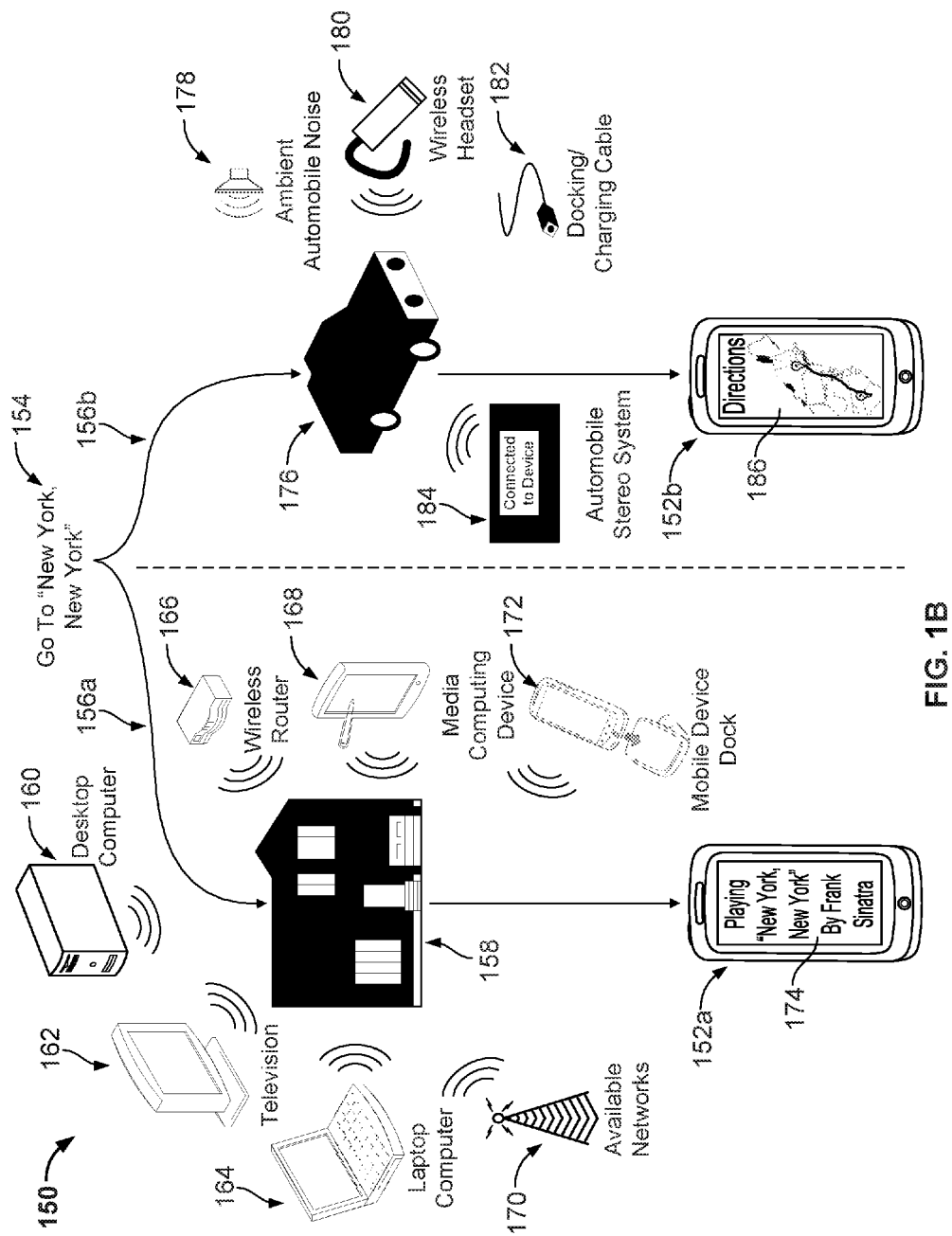

FIGS. 1A-B are conceptual diagrams 100 and 150 of example mobile computing devices 102 and 152a-b for disambiguating ambiguous user input 104 and 154. Referring to FIG. 1A, the example diagram 100 provides an illustrative example of the mobile computing device 102 receiving the ambiguous user input 104, determining a current context for the mobile computing device 102, disambiguating the ambiguous user input 104 based on the determined current context, and providing output that is associated with performance of a command associated with the disambiguated input.

In the example diagram 100, a user 103 is depicted as providing the ambiguous user input 104 "Go To New York, New York" as voice input to the mobile computing device 102. The mobile computing device 102 can include an input sub-system that includes a variety of devices, device interfaces, and input interpretation modules that are configured to receive audio input. For example, the user input 104 can be received using a digital microphone that is part of the mobile computing device 102 and/or a wireless interface connected to wireless headsets (e.g., BLUETOOTH headsets), and interpreted using a speech recognition module.

The mobile computing device 102 can allow a user to employ commands 105 that are associated with various features provided by the mobile computing device 102. For example, the command "Go To [Geographic Location]" can correspond to a mapping and/or driving directions feature that provides a map for and/or driving directions to a geographic location specified in the command. In another example, the command "Go To [Song]" can correspond to a digital music player on the mobile computing device that is configured to play a song specified in the command. In a further example, the command "Go To [Web Page]" can correspond to a web browser application on the mobile computing device that is configured to request and provide a web page specified in the command.

As indicated by step A (106), upon receiving the user input 104 the mobile computing device 102 can identify that the user input 104 is ambiguous. User input can be identified as ambiguous for a variety of reasons. Generally, user input is identified as being ambiguous if the system interprets it as having more than one likely intended meaning, in the absence of attempts to disambiguate the input using the techniques described here. For instance, in the present example, the user input 104 is identified as being ambiguous based on each of the commands 105 possibly corresponding to the input 104—the user input 104 "Go To New York, New York" can indicate a geographic location (the city of New York, N.Y.), a song (the song "New York, New York"), and a web page (a tourism web page for the city of New York, N.Y.). The commands 105 can be identified as possibly corresponding to the input 104 using any of a variety of techniques, such as polling an application and/or service corresponding to each command (e.g., querying a music player associated with the command "Go To [Song]" to determine whether "New York, New York" is an accessible song on the mobile computing device 102), accessing one or more groups of permissible terms for each command (e.g., accessing a group of permissible geographic location terms for the command "Go To [Geographic Location]"), etc.

User input, such as voice input, touch input (e.g., input received through a touchscreen), and key-based input (e.g., input received through a keypad/keyboard), can be identified as being ambiguous for a variety of reasons. For instance, as indicated in the example diagram 100, user input can be ambiguous when it corresponds to multiple different commands, regardless of whether the user input is voice input. For example, if the user input 104 is text-based input instead of voice input, as depicted, the mobile computing device 102 can still identify the user input 104 as ambiguous.

In another example, voice input that is identified as being a homophone (multiple terms with the same pronunciation but different meanings) and/or a homonym (multiple terms with the same spelling and pronunciation but different meaning) can be identified as ambiguous. For example, voice input that is interpreted as "fair," "sale," "waist," "example," "wore," and "cereal" are homophones (same pronunciation) of "fare," "sail," "waste," "egg sample," "war," and "serial," respectively, and can be identified as ambiguous. In another example, voice input that is interpreted as "tire" and "bank" are homonyms ("tire" can be part of a wheel (e.g., car tire) or a state of exhaustion; "bank" can be a place where money is stored or river bank) and can be identified as ambiguous.

Additionally, terms that are heteronyms (different pronunciations but with the same spelling) may be identified as ambiguous. Although the intended meaning of a heteronym may be conveyed by voice input through different pronunciations, this intended meaning may be removed when the voice input is converted text through speech recognition. For example, the term "close" can be pronounced differently when it is used to indicate proximity (e.g., "the store is close to your current location") and when it is used as a command (e.g., "please close the door"). However, when converted through speech recognition to text for use by the mobile computing device 102, the different pronunciations can be collapsed to the same term "close" and can be identified as ambiguous.

Furthermore, poor audio quality associated with voice input can cause otherwise unambiguous user input to be identified by the mobile computing device 102 as ambiguous. For instance, if the user 103 provides the user input 104 to the mobile computing device 102 from a location with a significant amount of background noise, the user input 104 may be received by the mobile computing device 102 with poor audio quality (e.g., the primary audio signal is washed out by background audio signals). User input received with poor audio quality can be identified by the mobile computing device 102 as ambiguous.

In another example, touch and key-based input can also be identified by the mobile computing device 102 as ambiguous. For instance, misspelled words typed by a user using a touchscreen or a keypad/keyboard can be identified as ambiguous. In another example, homographs (multiple words with the same spelling but different meaning) can be identified as ambiguous, similar to the examples provided above with regard to homophones.

With the ambiguous user input 106 identified (106), at step B a current context for the mobile device 102 can be determined (108). The current context includes information that describes the present state and/or surroundings of the mobile computing device 102 and/or the user of the mobile computing device at the time the input 106 is received. For instance, the current context can include a variety of information related to the mobile computing device 102 and the user, such as information regarding the surrounding physical environment (e.g., available networks, connections to other nearby computing devices, geographic location, weather conditions, nearby businesses, volume of ambient noise, level of ambient light, image captured by the mobile device's camera, etc.), the present state of the mobile computing device 102 (e.g., rate of speed, touchscreen input activated, audio input activated, ringer on/off, etc.), time and date information (e.g., time of day, date, calendar appointments, day of the week, etc.), user activity (e.g., recent user activity, habitual user activity), etc. The current context can be determined by the mobile computing device 102 using data and sensors that are local and/or remote to the mobile computing device 102.

As indicated by the example context 110 for the mobile device, the current context for the mobile computing device includes ambient noise level information 112*a*, geographic location information 112*b*, available network information 112*c*, rate of speed information 112*d*, and device activity information 112*e*. In the depicted example, the ambient noise level information 112*a* indicates that there is a high level of ambient noise and the geographic information 112*b* provides that the mobile computing device 102 is currently located on a road. The available network information 112*c* provides that an automobile BLUETOOTH network is available to the mobile computing device 102 (e.g., BLUETOOTH connection with an automobile stereo system) and the rate of speed information 112*d* indicates that the mobile computing device 102 is currently travelling at 50 miles per hour. The device activity information 112*e* indicates that telephone calls to one or more telephone numbers associated with New York, N.Y., have recently been made using the mobile computing device 102.

At step C, the mobile computing device 102 can disambiguate the user input 104 based on the current context 110 (114). For instance, based on the geographic location information 112*b* and the rate of speed information 112*d*, it can be inferred that the mobile computing device 102 is travelling in a vehicle of some sort (e.g., a car, a bus, etc.). This inference can further be supported by the high level of ambient noise generated during high speed road travel, as indicated by the ambient noise level information 112*a*. The mobile computing device 102 can further be identified as travelling in a car (instead of on a bus) based on the available automobile BLUETOOTH network, as indicated by the available network information 112*c*.

Based on the context of the mobile computing device 102 (travelling in a car on a highway of some sort), it is more likely that the user input 104 corresponds to the "Go To [Geographic Location]" command or to the "Go To [Song]" command than to the "Go To [Web Page]" command—a user in a car may be more likely to want a map/driving directions or to listen to music than to view a web page. Both the "Go To [Geographic Location]" command and the "Go To [Song]" command seem likely given the current context.

However, given that the mobile computing device 102 has recently been used to place telephone calls to a telephone number associated with a location in New York, N.Y., it can be inferred that the user 103 and the mobile computing device 102 are likely travelling to a destination in New York, N.Y. For instance, the user 103 may have recently called to confirm his/her reservation at a hotel in New York where he/she will be staying. Based on the inference that the user 103 and the mobile computing device 102 are travelling to New York, the "Go To [Geographic Location]" command can be selected from among the commands 105 as being the command most likely intended by the user 103 with the user input 104.

At step D, output for the disambiguated command ("Go To [Geographic Location]") can be provided on the mobile computing device 102 (116). For example, a map 118 depicting driving directions from the current geographic location of the mobile computing device 102 to New York, N.Y., can be provided on the mobile computing device 102.

As indicated above, the manner in which output is provided on the mobile computing device 102 can be selected based on the current context 110. For instance, in the present example, the mobile computing device 102 is determined to be travelling in a car at a high rate of speed on a highway. It may be dangerous to only present the directions visually as the map 118 on the mobile computing device 102, as it will likely take a user's focus off the road. However, the driving directions could be provided audibly by the mobile computing device 102 in addition to (or instead of) the map 118.

As discussed previously, some portions of the steps A-D (106, 108, 114, and 116) can be performed locally on the mobile computing device 102 and/or in conjunction with a remote system. For example, the mobile computing device 102 can provide the received voice-based user input 104 from the user 103 to a remote system that implements a robust speech recognition service over a network. In response, the mobile computing device 102 can receive transcribed text for the user input 104 from the remote system. The distribution of the steps A-D (106, 108, 114, and 116) across the mobile computing device 102 and one or more remote systems can vary. For example, in some implementations, the mobile computing device 102 can perform all of the steps A-D locally as a standalone device.

In some implementations, at least a portion of the steps A-D can be performed in conjunction with a remote system.

Referring to FIG. 1B, the example diagram 150 provides an illustrative example of how disambiguation of user input 154 can be different depending on a context associated with a mobile computing device 152a-b. In this example, the mobile computing device 152a-b is intended to demonstrate alternate paths that can result in different contexts in response to the user input 154.

Similar to the ambiguous user input 104 discussed above with regard to FIG. 1A, the user input 154 can be identified as ambiguous. In the first alternate path 156a, the mobile computing device 152a is located in a user's home 158. The context for the mobile computing device 152a is depicted as including a desktop computer 160, a television 162, a laptop computer 164, a wireless router 166, a media computing device 168, available networks 170, and a mobile device dock 172. Each of devices 160-172 may output a signal (e.g., sound, wireless data/network transmission, etc.) that the mobile computing device 152a can detect directly or indirectly. For example, the television 162 can output sound, light, and/or a wireless networking signal that the mobile computing device 152a can detect. In another example, the mobile computing device 152a can identify a wireless router 166 that provides a wireless network for the user's home 158 as well as other available networks 170, such as the wireless networks of the user's neighbors, cellular telephone networks, etc.

Similarly, the mobile computing device 152a can detect each of the devices 160-172 through direct and/or indirect connections with the devices 160-172. For example, the mobile computing device 152a can connect to a home network through the wireless router 166, though which the mobile computing device 152a can communicate with the devices 160-172. In another example, the mobile computing device 152a can identify the mobile device dock 172 through a physical docking connection. For instance, the mobile device dock 172 may be a stereo system with which the mobile computing device 152a can be docked to play music.

The mobile computing device 152a can determine that it is physically located at the user's home 158 based on the detected proximity of one or more of the devices 160-172. For example, the mobile computing device 152a can determine when a wireless network "examplenet1234" provided by the wireless router 166 is available, that the mobile computing device 152a is located in or near the home 158.

As described above with regard to FIG. 1A, the mobile computing device 152a can disambiguate the user input 154 based on the current context for the mobile computing device 152a. In this example, the current context includes the mobile computing device 152a being located at the home 158 and physically connected to the mobile device dock 172, through which the mobile computing device 152a can play music. Based on the current context, the ambiguous user input 154 can be disambiguated to one of the commands 105 discussed above with regard to FIG. 1A. In the present example, the ambiguous user input 154 is disambiguated to the "Go To [Song]" command based on the mobile computing device 152a being stationary (not travelling) and being able to play music through a connection with the mobile device dock 172. As illustrated by the display 174 on the mobile computing device 152a, the disambiguated user input (selection of the command "Go To [Song]" from the ambiguous user input 154) can be used to play the song "New York, New York" by Frank Sinatra.

In contrast, the different context for the mobile computing device 152b, which is located in a car 176, can cause the mobile computing device 152b to disambiguate the user input 154 differently than the mobile computing device 152a. The mobile computing device 152b can determine that it is located in the car 176 based on ambient car noises 178 (e.g., engine noise, wind, etc.), a signal from and/or connection to a wireless headset 180, a connection with the docking/charging cable 182 (e.g., a mobile computing device charger powered off a cigarette lighter outlet in the car 176), and a connection with an automobile stereo system 184 (e.g., a wireless BLUETOOTH connection through which the mobile computing device can stream audio data to be played on the stereo system 184). The presence of one or more of the detected features 178-184 can indicate that the mobile computing device 152b is physically located in the car 176.

Similar to the disambiguation of the user input 104 described above with regard to mobile computing device 102, the mobile computing device 152b can disambiguate the user input 154 by selecting the "Go To [Geographic Location]" command from the commands 105 based on the device's current context, which includes being located in the car 176. Output from performance of the selected command is illustrated by a map 186 displayed on the mobile computing device 152b that provides driving directions to New York, N.Y.

Figure 2A:
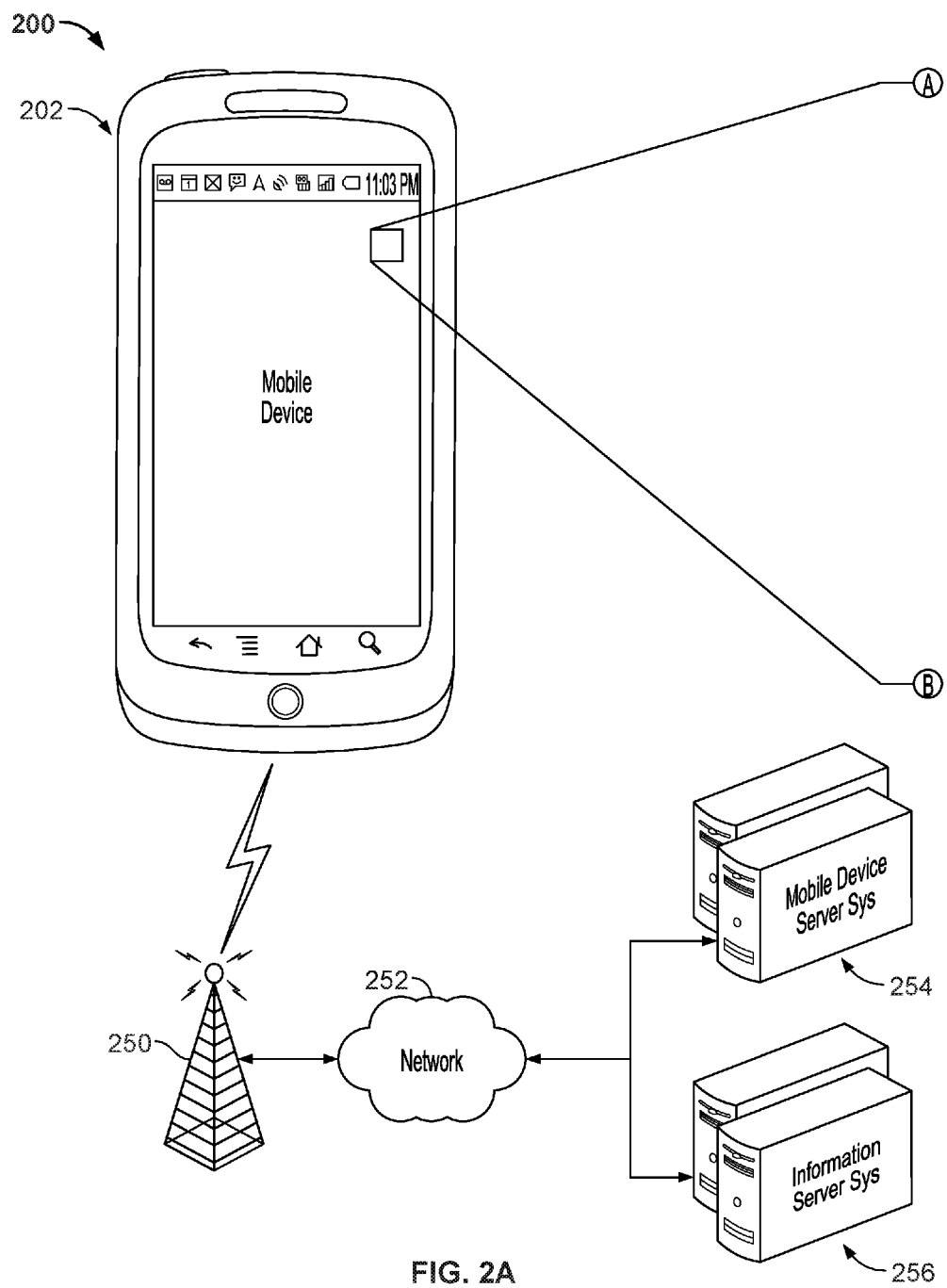
FIGS. 2A-B are diagrams of an example system for disambiguating ambiguous user input on a mobile computing device.
Figure 2B:
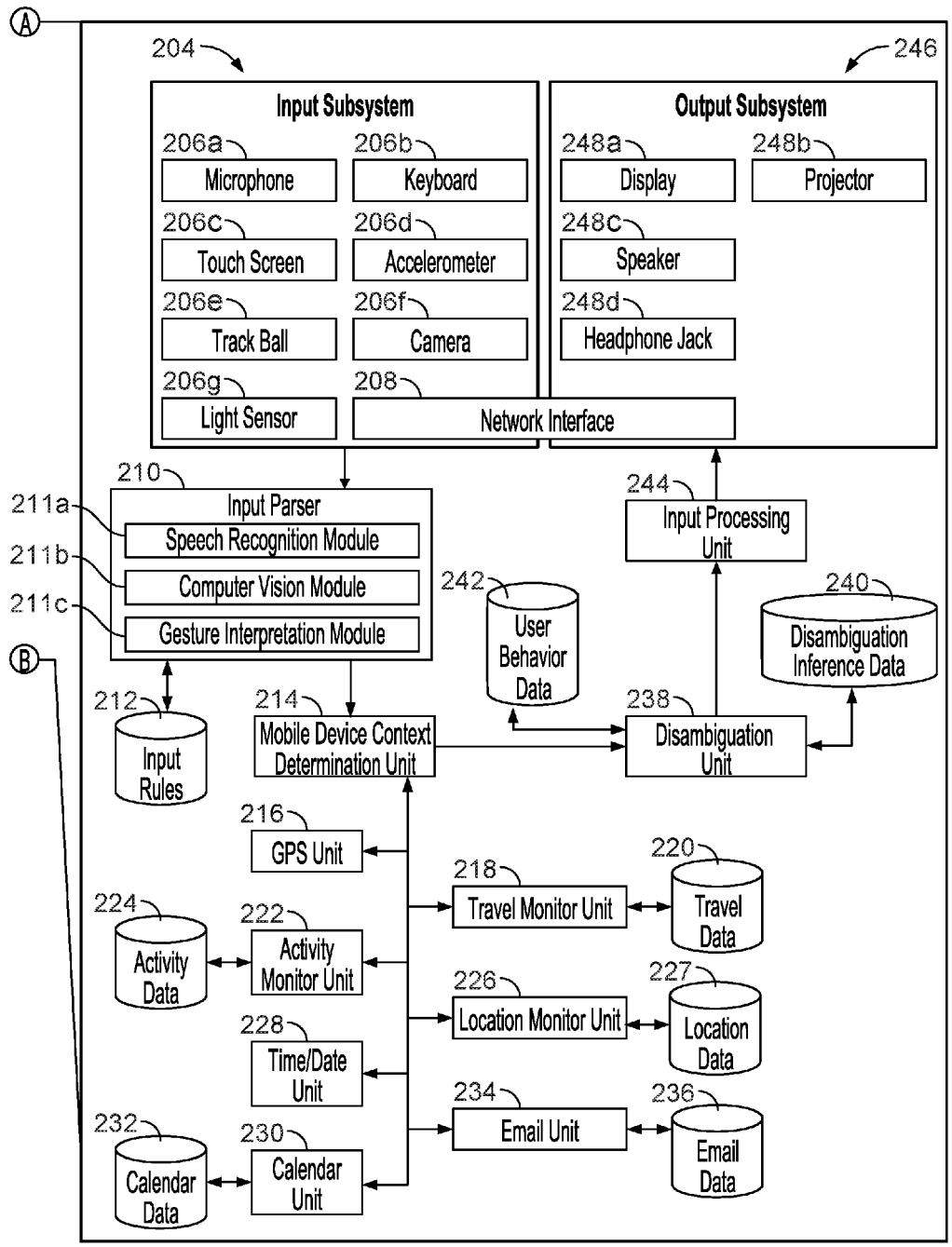

FIGS. 2A-B are diagrams of an example system 200 for disambiguating ambiguous user input on an example mobile computing device 202. The mobile computing device 202 can be configured to disambiguate ambiguous user input based upon a current context associated with the mobile computing device 202 and/or a user of the mobile computing device, similar to the mobile computing devices 102 and 152a-b described above with regard to FIGS. 1A-B.

The mobile computing device 202 is depicted as including an input subsystem 204 through which a user of the mobile computing device 202 can provide ambiguous user input. Referring to FIG. 2B, the input subsystem 204 is depicted as including a microphone 206a (configured to receive audio-based input), a keyboard 206b (configured to receive key-based input), a touchscreen 206c (configured to receive screen touch-based input), an accelerometer 206d (configured to receive motion-based input), a trackball 206e (configured to receive GUI pointer-based input), a camera 206f (configured to receive visual input), and a light sensor 206g (configured to receive input based on light intensity). The input subsystem 204 also includes a network interface 208 (e.g., wireless network interface, universal serial bus (USB) interface, BLUETOOTH interface, public switched telephone network (PSTN) interface, Ethernet interface, cellular network interface, 3G and/or 4G network interface, etc.) that is configured to receive network-based input and output. Other types of input devices not mentioned may also be part of the input subsystem 204.

An input parser 210 of the mobile computing device 202 can be configured to receive input from the input subsystem 204 (e.g., input events) and determine whether the received input is ambiguous. The input parser 210 can include a variety of modules to interpret user input, such as a speech recognition module 211a, a computer vision module 211b, and a gesture interpretation module 211c. The speech recognition module 211a can interpret audio-based input received through the input subsystem 204, such as converting voice input received by the microphone 206a into text. The computer vision module 211b can interpret image-based input received through the input subsystem 204, such as identifying objects in video received through the camera 206f. The gesture interpretation module 211c can interpret gesture-based input received through the input subsystem 204, such as determining whether gesture information received through the accelerometer 206d and one or more gyroscopes (not depicted) corresponds to a predefined gesture on the mobile computing device 202.

The input parser 210 can use input rules 212 to determine whether a particular input is ambiguous and in need of disambiguation. For instance, the input rules 212 can identify a threshold level of audio quality below which received audio input is determined to be ambiguous. In another example, the input rules 212 can provide terms and phrases that are ambiguous when received as voice input, such as homophones. The user input rules 212 can also include the other examples of identifying user input as ambiguous described above with regard to FIG. 1A. The input rules 212 can be preconfigured and/or user defined.

In response to the input parser 210 identifying input that is ambiguous, a mobile device context determination unit 214 can determine a current context for the mobile computing device 202. The mobile device context determination unit 214 can determine a current context for the mobile device 202 using a variety of context monitoring units of the mobile computing device 202.

For instance, a global positioning system (GPS) unit 216 can provide geographic location information to the mobile device context determination unit 214 and a travel monitor unit 218 (in conjunction with a travel data repository 220) can provide information related to a route currently being traveled and habitual routes traveled by the mobile computing device 202. An activity monitor unit 222 (in conjunction with an activity data repository 224) can provide information related to recent and habitual user activity (e.g., applications used, specific information accessed at various times, etc.) on the mobile device 202. A location monitor unit 226 can provide information regarding a current physical location (e.g., home, work, in a car, etc.) for the mobile computing device 202. The location monitor unit 226 can use a location data repository 227 to determine the current physical location. The location data repository 227 can associate information regarding the mobile computing device 202's detected surroundings (e.g., available wireless networks, ambient sounds, nearby computing devices, etc.) with physical locations. The location monitor unit 226 can also identify entities (e.g., businesses, parks, festivals, public transportation, etc.) that are physically located near the mobile device 202.

A time and date unit 228 can provide current time and date information and a calendar unit 230 (in conjunction with a calendar data repository 232) can provide information related to appointments for the user. An email unit 234 (in conjunction with an email data repository 236) can provide email-related information (e.g., recent emails sent/received). The mobile context determination unit 214 can receive information from other context monitoring units not mentioned or depicted.

In some implementations, the context monitoring units 216-236 can be implemented in-part, or in-whole, remote from the mobile computing device 202. For example, the email unit 234 may be a thin-client that merely displays email-related data that is maintained and provided by a remote server system. In such an example, the email unit 234 can interact with the remote server system to obtain email-related information to provide to the mobile device context determination unit 214.

A disambiguation unit 238 can use the current context for the mobile device 202, as determined by the mobile device context determination unit 214, to disambiguate user input that has been determined to be ambiguous by the input parser 210. The current context of the mobile computing device 202 can be used to infer which of multiple disambiguation candidates was intended by the user. Referring to the example described above with regard to FIG. 1A, each of the commands 105 can be considered a disambiguation candidate—a possible command that can be selected for the received ambiguous user input 104. From the current context 110 of the mobile computing device 102, the user input 104 was inferred as indicating a request for a map/driving directions instead of a request to play music or access a web page.

The disambiguation unit 238 can use information stored in a disambiguation inference data repository 240 that associates various context scenarios with various inferences that can be used to disambiguate user input. For example, the disambiguation inference data repository 240 can include information that indicates that when the current context of the mobile computing device 202 includes being physically located in a car, the user is more likely to be interested in driving directions than in viewing a web page. The information stored in the disambiguation inference data repository 240 can be user defined and/or predefined.

The disambiguation inference data repository 240 can be used in conjunction with a user behavior data repository 242 by the disambiguation unit 238 to disambiguate user input. The user behavior data repository 242 can log previous ambiguous user input, a context for the mobile device 202 at the time of the ambiguous user input, previous disambiguation of the user input by the disambiguation unit 238, and the user's subsequent behavior (e.g., user appeared to use the information, user immediately provided clarifying input, etc.) with respect to output provided based on the disambiguated user input. The user behavior data stored in the user behavior data repository 242 can indicate whether disambiguation of a user's ambiguous input based on the context of the device 202 was what the user intended with the ambiguous user input.

For example, if the user is provided with driving directions in response to ambiguous user input and the mobile device 202 is determined to travel to a destination according to the driving directions, then the associated user behavior data can indicate that the user found the disambiguation of the user input based on the device's context to be what the user intended with the input. In another example, if the user is provided with driving directions in response to ambiguous user input and the user immediately provides additional input indicating that the user would like for music to be played, then the associated user behavior can indicate that the user found the disambiguation of the user input to not be what the user intended.

The disambiguation unit 238 can use user behavior data from the user behavior data repository 242 to infer what the user intended with the ambiguous user input. For example, the disambiguation unit 238 can attempt to identify previous contexts that are similar to a current context for the mobile device 202 to receive an indication regarding what the user intended with ambiguous user input.

Using disambiguated user input provided by the disambiguation unit 238, an input processing unit 244 can process the disambiguated user input. In some implementations, the input processing unit 244 can forward the disambiguated user input to an application and/or service that is associated with the user input (e.g., provide a disambiguated request to play music to a music player application). In some implementations, the input processing unit 244 can cause one or more operations associated with the disambiguated user input to be performed. For instance, the input processing unit 244 may communicate with a remote server system that is configured to perform at least a portion of the operations associated with the disambiguated input.

As described above with regard to FIGS. 1A-B, commands associated with disambiguated user input can be performed local and/or remote to the mobile computing device 202. For instance, in implementations where a calendar application is implemented locally on the mobile computing device 202, disambiguated user input that indicates a request for calendar information can be performed locally on the mobile computing device 202 (e.g., querying the calendar unit 230 for relevant calendar information stored in the calendar data repository 232). Additionally, the mobile computing device 202 can determine its current context and disambiguate ambiguous user input as a stand-alone device (e.g., without interacting with a remote server system over a network). In another example, in implementations where a calendar data for a calendar application is provided on a remote server system, the mobile computing device 202 can interact with the remote server system to access the relevant calendar information.

An output subsystem 246 of the mobile computing device 202 can provide output obtained by the input processing unit 244 to a user of the device 202. The output subsystem 246 can include a variety of output devices, such as a display 248a (e.g., a liquid crystal display (LCD), a touchscreen), a projector 248a (e.g., an image projector capable of projecting an image external to the device 202), a speaker 248c, a headphone jack 248d, etc. The network interface 208 can also be part of the output subsystem 246 and may be configured to provide the results obtained by the result identification unit 244 (e.g., transmit results to BLUETOOTH headset).

Referring to FIG. 2A, the mobile computing device 202 can wirelessly communicate with wireless transmitter 250 (e.g., a cellular network transceiver, a wireless network router, etc.) and obtain access to a network 252 (e.g., the Internet, PSTN, a cellular network, a local area network (LAN), a virtual private network (VPN), etc.). Through the network 252, the mobile computing device 202 can be in communication with a mobile device server system 254 (one or more networked server computers), which can be configured to provide mobile device related services and data to the mobile device 202 (e.g., provide calendar data, email data, connect telephone calls to other telephones, etc.).

The mobile device 202 can also be in communication with one or more information server systems 256 over the network 252. Information server systems 256 can be server systems that provide information that may be relevant to processing user input. For instance, the information server systems 256 can provide current traffic conditions, up-to-date driving directions, a weather forecast, and information regarding businesses located near the current geographic location for the mobile device 202.

FIG. 3 is a flowchart of an example technique 300 for disambiguating ambiguous user input on a mobile computing device. The example technique 300 can be performed by any of a variety of mobile computing devices, such as the mobile computing devices 102 and 152a-b described above with regard to FIGS. 1A-B and/or the mobile computing device 202 described above with regard to FIGS. 2A-B.

The technique 300 starts at step 302 by receiving user input. The user input can be any of a variety of input, such as key-based input (keyboard/keypad input), touch-based input on a touchscreen, voice input, gesture input (performing a physical gesture with the mobile computing device), etc. For example, the mobile computing device 102 receives the voice input 104, as described with regard to FIG. 1A. In another example, the mobile computing device 202 can receive user input using the input subsystem 204, as described with regard to FIGS. 2A-B.

In some implementations, speech recognition with regard to the user input can be performed (step 304). For instance, the speech recognition module 211a can convert voice input received through the input subsystem 204 of the mobile computing device 202 into text. The speech recognition module 211a can also be used in situations where the ambiguous user input is not voice input. For example, if the user input is touch or key-based input, the speech recognition module 211a may be used to audibly identify background speech when the input is received for the purpose of determining a context associated with the mobile computing device 202.

The user input is identified as ambiguous (step 306). For example, the mobile computing device 202 can use the input parser 210 and the input rules 212 to identify user input that is ambiguous, as described above with regard to FIGS. 2A-B. For instance, user input can be identified as being ambiguous if it can be interpreted as having more than one possible intended meaning. For instance, the command "Go To New York, New York" can be interpreted as possibly corresponding to the command "Go To [Geographic Location]" and to the command "Go To [Song]," as described above with regard to FIG. 1A.

A variety of steps can be performed to obtain information that indicates a current context for a mobile device. For example, in some implementations one or more ambient sounds can be detected (step 308), one or more physical object located nearby the mobile computing device can be optically identified (step 310), and/or one or more other computing devices located nearby the mobile computing device can be identified (step 312). For example, the input parser 210 can use information obtained by the input subsystem 204 in conjunction with the user input to make such determinations. For instance, the speech recognition module 211a can be used to detect ambient sounds and to determine whether the ambient sounds correspond to speech and/or to other objects (e.g., car, television, dish washer, pet, wind, etc.). In another example, the computer vision module 211b can be used to optically identify physical objects based on images obtained from the camera 206f of the mobile computing device 202. In a further example, the network interface 208 can be used to identify other computing devices based available wired and/or wireless connections to the other computing devices. Other steps for obtaining information to determine a current context for a mobile computing device that are not explicitly described may also be part of the technique 300.

In some implementations, information that associates the other computing devices with physical locations can be accessed (step 314). Physical locations can correspond to physical structures, which may not be tied to a particular geographic location. For instance, a physical structure can be mobile, such as a car or a train. Such mobile physical structures can move from one geographic location to another (e.g., a car travel from Los Angeles, Calif., to San Francisco, Calif.). However, some physical structures are stationary and tied to a particular geographic location, such as a skyscraper. Referring to FIG. 2B as an example, the location data 227 can provide information that associates the other computing devices with physical locations, such as a car or a house.

Using the information detected, identified, and accessed in steps 308-314, as well as other context-related information not explicitly described with regard to this technique, the current context for the mobile computing device can be determined (step 316). For example, the mobile device context determination unit 214 of the mobile computing device 202 can be used to determine a current context for the mobile computing device 202, as described above with regard to FIGS. 2A-B. For instance, the current context of the mobile computing device 102 is determined to indicate that the mobile computing device 102 is travelling in a car with a likely destination of New York, N.Y., as described above with regard to FIG. 1A.

The user input can be disambiguated based on the current context for the mobile computing device (step 318). For example, the disambiguation unit 238 of the mobile computing device 202 can use the current context, as determined by the context determination unit 214, to disambiguate the ambiguous user input received through the input subsystem 204. As described above with regard to FIG. 1A, the user input "Go To New York, New York" can be disambiguated to the command "Go To [Geographic Location]" based on the determined context 110 for the mobile computing device 102.

In some implementations, a determination can be made as to whether a command selected for the ambiguous user input applies to one or more of the identified other computing devices (step 320). For example, the input processing unit 244 can determine whether the selected command should be performed by and/or output associated with performance of the selected command should be provided on one of the other identified computing devices. For instance, if the mobile computing device 202 identifies that a television is accessible to the mobile computing device 202 (e.g., the mobile computing device can electronically communicate with the television and instruct the television to display content) and the selected command pertains to playing a video, the input processing unit 214 can determine that the selected command pertains to the identified television.

Based on the determination made in step 320, the mobile computing device can communicate with the identified other computing device (step 322). Expanding upon the example from the previous paragraph, the mobile computing device 202 can communicate with the identified television to cause the selected command (play a video) to be performed and/or output by the television (e.g., play the video on the television).

In some implementations, a mode of operation for the mobile computing device can be selected (step 324). A mode of operation can pertain to the manner in which output is provided by the mobile computing device and can be used to determine which components of the output subsystem 246 are used to provide output to a user. A few example modes of operations include: a voice-only mode of operation during which the microphone 206a of the mobile computing device 202 is activated to received voice input and the speaker 248c of the mobile computing device 202 is used to provide output; a silent mode of operation during which the speaker 248c of the mobile computing device 202 is deactivated and a display 248a of the mobile computing device 202 is used to provide output; and a user-defined mode of operation during which the microphone 206a, the speaker 248c, and the display 248a of the mobile computing device 202 are used to receive input and to provide output according to user-defined settings for the mobile computing device 202. The mode of operation can be selected by the mobile computing device 202 based on a variety of factors, including the determined current context for the mobile computing device 202.

Output associated with the selected command can be caused to be provided in association with the mobile computing device (step 326). For example, the output subsystem 246 of the mobile computing device 202 can provide output based on performance of the selected command. The output can be provided on the mobile computing device 202 in accordance with the selected mode of operation. In another example, one of the identified other computing devices, such as the television described above, can be selected and caused to provide output for the selected command.

In some implementations, second user input can be received (step 328) and a determination can be made as to whether the ambiguous user input was correctly disambiguated based on the received second input (step 330). For example, if, after providing output associated with performance of the disambiguated user input, the user provides second input that clarifies the previously received ambiguous input (e.g., provide voice command "Go To Song New York, New York" after driving directions are displayed for the command "Go To New York, New York"), the mobile computing device 202 may determine that the ambiguous user input was not disambiguated correctly. However, if the second input further interacts with the output provided based on the disambiguation (e.g., zoom in on a portion of the driving directions provided for the command "Go To New York, New York"), the mobile computing device 202 may determine that the ambiguous user input was correctly disambiguated. Based on the determination of whether the ambiguous user input was correctly disambiguated, user behavior data can be updated (step 332). For instance, the user behavior data 242 can be updated to reflect whether the ambiguous user input was correctly disambiguated for the current context and stored for subsequent use by the disambiguation unit 238 when attempting to disambiguate user input.

FIG. 4 is a conceptual diagram of a system that may be used to implement the techniques, systems, mechanisms, and methods described in this document. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMO- LED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-4', '*', and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile computing device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 5:
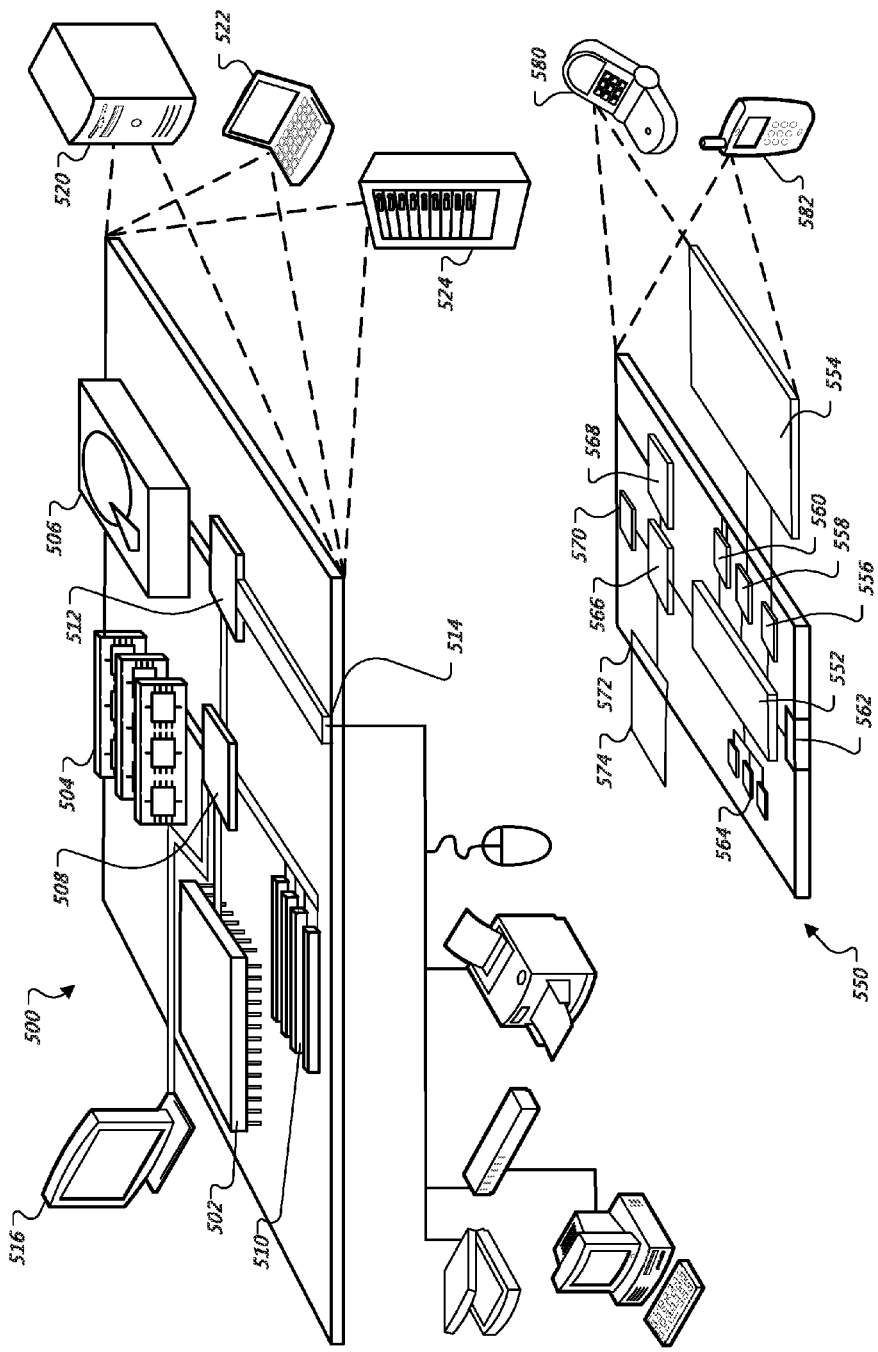
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for disambiguating ambiguous user input be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   receiving, by a computing system, an input that was entered at a mobile computing device;
   identifying, by the computing system, the input as being ambiguous due to the input being able to be represented by either of at least two commands or at least two transcriptions of audio;
   determining, by the computing system, whether the mobile computing device is identified as traveling in a vehicle, wherein the computing system determines that the mobile computing device is identified as traveling in the vehicle based on a determination that the mobile computing device is traveling at a rate of speed that exceeds a threshold value using measurements by one or more sensors in the mobile computing device;
   applying, by the computing system, the input to a rule that uses the determination that the mobile computing device is identified as traveling in the vehicle to select one of the at least two commands or the at least two transcriptions of audio as a selected command or transcription; and
   causing, by the computing system, the mobile computing device to provide output associated with the selected command or transcription.

2. The computer-implemented method of claim 1, wherein:
   the input is voice input that was captured by a microphone of the computing device;
   identifying the input as being ambiguous includes identifying that the input is able to be represented by either of the at least two transcriptions of audio; and
   applying the input to the rule includes using a determination that the mobile computing device is traveling in the vehicle to select one of the at least two transcriptions of audio as the selected transcription.

3. The computer-implemented method claim 1, wherein:
   identifying the input as being ambiguous includes identifying that the input is able to be represented by either of the at least two commands; and
   applying the input to the rule includes using a determination that the mobile computing device is traveling in the vehicle to select one of the at least two commands.

4. The computer-implemented method of claim 3, wherein the input is text-based input that was typed at the mobile computing device.

5. The computer-implemented method of claim 1, wherein the input that was entered at the mobile computing device is a portion of a larger input that was entered at the mobile computing device.

6. The computer-implemented method of claim 1, wherein the computing system determines that the mobile computing device is identified as traveling in the vehicle based on a determination that the mobile computing device has connected to a wireless connection associated with the vehicle.

7. A computer-implemented method, comprising:
   receiving, by a computing system, an input that was entered at a mobile computing device;
   identifying, by the computing system, the input as being ambiguous due to the input being able to be represented by either of at least two commands or at least two transcriptions of audio;
   determining, by the computing system, whether the mobile computing device is identified as traveling in a vehicle, wherein the computing system determines that the mobile computing device is identified as traveling in the vehicle based on a determination that the mobile computing device is recording a high level of ambient noise;
   applying, by the computing system, the input to a rule that uses the determination that the mobile computing device is identified as traveling in the vehicle to select one of the at least two commands or the at least two transcriptions of audio as a selected command or transcription; and
   causing, by the computing system, the mobile computing device to provide output associated with the selected command or transcription.

8. A non-transitory computer-readable medium encoded with instructions that, when executed by one or more processors, operate to cause one or more processors to perform operations comprising:
   receiving, by a computing system, an input that was entered at a mobile computing device;
   identifying, by the computing system, the input as being ambiguous due to the input being able to be represented by either of at least two commands or at least two transcriptions of audio;
   determining, by the computing system, whether the mobile computing device is identified as traveling in a vehicle, wherein the computing system determines that the mobile computing device is identified as traveling in the vehicle based on a determination that the mobile computing device is traveling at a rate of speed that exceeds a threshold value using measurements by one or more sensors in the mobile computing device;

applying, by the computing system, the input to a rule that uses the determination that the mobile computing device is identified as traveling in the vehicle to select one of the at least two commands or the at least two transcriptions of audio as a selected command or transcription; and causing, by the computing system, the mobile computing device to provide output associated with the selected command or transcription.

9. The non-transitory computer-readable medium of claim 8, wherein:

the input is voice input that was captured by a microphone of the computing device;

identifying the input as being ambiguous includes identifying that the input is able to be represented by either of the at least two transcriptions of audio; and applying the input to the rule includes using a determination that the mobile computing device is traveling in the vehicle to select one of the at least two transcriptions of audio as the selected transcription.

10. The non-transitory computer-readable medium of claim 8, wherein:

identifying the input as being ambiguous includes identifying that the input is able to be represented by either of the at least two commands; and applying the input to the rule includes using a determination that the mobile computing device is traveling in the vehicle to select one of the at least two commands.

11. The non-transitory computer-readable medium of claim 10, wherein the input is text-based input that was typed at the mobile computing device.

12. The non-transitory computer-readable medium of claim 8, wherein the input that was entered at the mobile computing device is a portion of a larger input that was entered at the mobile computing device.

13. The non-transitory computer-readable medium of claim 8, wherein the computing system determines that the mobile computing device is identified as traveling in the vehicle based on a determination that the mobile computing device has connected to a wireless connection associated with the vehicle.

14. A non-transitory computer-readable medium encoded with instructions that, when executed by one or more processors, operate to cause one or more processors to perform operations comprising:

receiving, by a computing system, an input that was entered at a mobile computing device;

identifying, by the computing system, the input as being ambiguous due to the input being able to be represented by either of at least two commands or at least two transcriptions of audio;

determining, by the computing system, whether the mobile computing device is identified as traveling in a vehicle, wherein the computing system determines that the mobile computing device is identified as traveling in the vehicle based on a determination that the mobile computing device is recording a high level of ambient noise;

applying, by the computing system, the input to a rule that uses the determination that the mobile computing device is identified as traveling in the vehicle to select one of the at least two commands or the at least two transcriptions of audio as a selected command or transcription; and causing, by the computing system, the mobile computing device to provide output associated with the selected command or transcription.

* * * * *